United States Patent [19]

Johnson et al.

[11] 4,389,050

[45] Jun. 21, 1983

[54] MECHANICAL SEAL HAVING A SEAL INSERT MOUNTED IN A LAMINATED SHELL

[75] Inventors: Norman E. Johnson, Barrington; Harold F. Greiner, Warwick, both of R.I.

[73] Assignee: EG&G Sealol, Inc., Warwick, R.I.

[21] Appl. No.: 398,927

[22] Filed: Jul. 16, 1982

[51] Int. Cl.³ .............................................. F16J 15/34
[52] U.S. Cl. ........................................ 277/26; 277/38; 277/42; 277/81 R; 277/88
[58] Field of Search ............... 277/26, 35, 38-43, 277/81 R, 88-90

[56] References Cited

U.S. PATENT DOCUMENTS

| | | | |
|---|---|---|---|
| 2,866,656 | 12/1958 | Dobrosavljevic | 277/90 X |
| 2,884,268 | 4/1959 | Amirault et al. | |
| 3,018,112 | 1/1962 | Amirault et al. | 277/42 |
| 3,157,404 | 11/1964 | Doble | 277/38 X |
| 3,160,418 | 12/1964 | Barske | 277/90 |
| 3,695,791 | 10/1972 | Brundage | 277/26 X |

FOREIGN PATENT DOCUMENTS

| | | | |
|---|---|---|---|
| 727135 | 3/1955 | United Kingdom | 277/88 |
| 809458 | 2/1959 | United Kingdom | 277/89 |

*Primary Examiner*—Robert S. Ward, Jr.
*Attorney, Agent, or Firm*—Finnegan, Henderson, Farabow, Garrett & Dunner

[57] ABSTRACT

A mechanical face seal including a non-rotable member fixed to a container and a rotatable member fixed to a shaft. The rotatable member includes a laminated holder constructed of press-fitted, metallic bands, and a non-metallic insert press-fitted in the holder. The outer band is in tension and the inner band in compression upon assembly of the holder so that the stresses in these parts tend to balance one another. Upon assembly of the insert to the holder, the inner band may be in tension.

5 Claims, 2 Drawing Figures

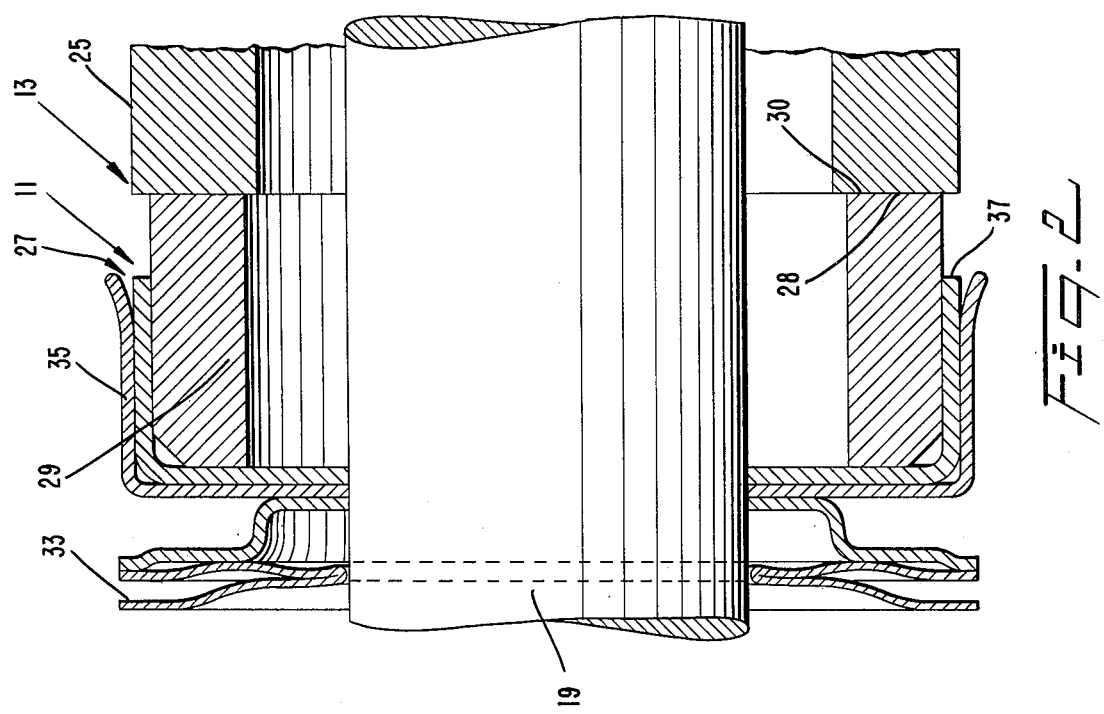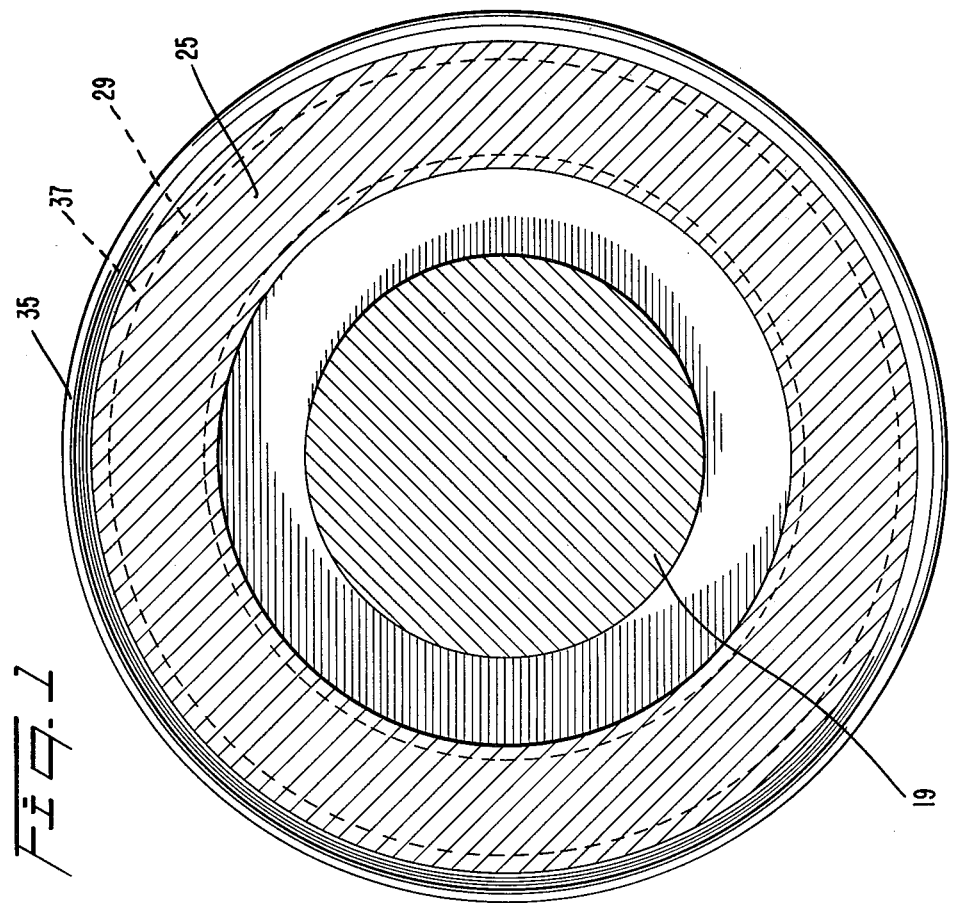

MECHANICAL SEAL HAVING A SEAL INSERT MOUNTED IN A LAMINATED SHELL

BACKGROUND OF THE INVENTION

The present invention relates to a mechanical seal of the type which includes a rotatable member and a non-rotatable member provided with confronting radial faces and which are biased into rubbing engagement, and more particularly to a seal of this type which includes a laminated holder and a low-friction insert which forms one of the seal members.

Mechanical face seals of the type of which the present invention relates are used to seal an opening in the wall of a pressurized container through which a rotatable shaft extends. These seal assemblies include rings one of which is non-rotatably carried by the container and the other fixed to the shaft. One of the rings is provided with an insert constructed of a low friction material having a radial face which confronts a machined radial face on the other ring. One of the rings is biased toward the other so that the confronting faces of the rings rubbingly engage and maintain a pressure seal between the shaft and container wall.

The low friction insert is a non-metallic annular member press fitted in a holder, usually a metallic ring. It is important that the holder and insert assembly remain stable i.e., not distort or become loose during operation of the device. To this end, it is important that this assembly remain stable and resist distortion and separation throughout a range of temperatures which are expected to develop on the seal during its use, and under stresses which arise as a result of pressure in the container and centrifugal forces during rotation of the seal.

It will be appreciated that temperature rise occurs mainly from the sealed fluid in the container and from friction during use of the seal and causes the assembled holder and insert to expand. The coefficient of expansion of the metallic holder is different from that of the non-metallic insert so that a sufficient temperature rise can cause the insert to become loose in the holder thereby destroying the seal. Also, sufficient expansion of the holder relative to the insert can weaken the connection between their parts allowing distortion of the assembly and resultant seal loss.

SUMMARY OF THE INVENTION

The present invention overcomes the problems and disadvantages discussed above by providing a seal insert and holder assembly which is stable and maintains an effective seal over a wide range of temperatures, and which resists adverse effects of pressure, heat, friction and centrifugal force.

Further objects of the invention are to provide an improved holder and insert assembly of the above character which is relatively inexpensive and easy to construct.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the present invention relates to a mechanical face seal comprising rotatable and non-rotatable members rubbingly engageable along substantially radial faces, one of the members including a laminated holder formed by a plurality of bands which are press-fitted to one another, the outermost band being in tension and the innermost band being in compression so that stresses in the bands tend to balance one another, and an annular insert press fitted into the holder and formed with one of the rubbingly engageable faces.

In another aspect, the present invention relates to a mechanical face seal of the type including a rotatable seal member fixed to a shaft and a non-rotatable seal member, the rotatable and non-rotatable members having confronting radial faces in rubbing engagement, and includes the improvement wherein one of the members comprises a composite assembly including at least two concentric metallic bands press-fitted together and forming a laminated holder, the outermost band being in tension and the innermost band being in compression so that stresses in the bands tend to balance one another, and a non-metallic insert press-fitted in the holder.

The accompanying drawings which are incorporated in and constitute a part of this specification, illustrate an embodiment of the invention and, together with the description that follows, serves to explain the principles of the invention.

BRIEF DESCRIPTION OF THE DRAWINGS

FIG. 1 is a sectional view showing a mechanical face seal embodying a preferred form of the present invention; and FIG. 2 is a plan view of the holder and insert assembly of the present invention.

DESCRIPTION OF THE PREFERRED EMBODIMENT

Reference will now be made in detail to the present preferred embodiment of the invention, an example of which is illustrated in the accompanying drawings.

The preferred embodiment of the present invention includes a holder and insert assembly which is illustrated generally at 11 in FIG. 2 and is seen to be part of a mechanical face seal 13 which provides a pressure seal between an opening formed in a container (not shown) and a rotatable shaft 19. The container can be a housing for a pump, compressor, gear box, or the like used in such installations as aerospace, refineries, chemical plants, etc. where pressurized fluids or gases in a container must be sealed.

The seal 13 includes a seal ring 25 which is fixed to the housing at its opening. The assembly 11 includes an annular insert 29 formed of a low friction material such as carbon and provided with a radial face 30, and which is mounted in a holder 27. The radial face 30 on the insert confronts and rubbingly engages a radial face 28 on seal ring 25. The assembly 11 is fixed for rotation with the shaft 19 and is biased by a resilient bellows 33 toward the holder 27 to maintain rubbing engagement between the faces 28,30. This forms a primary seal between the shaft 19 and the container.

It will be understood that the assembly 11 of the present invention finds particular use as the rotatable component of a mechanical face seal because of the high stresses developed in this component. However, this invention may also be used in connection with an insert used in the non-rotatable component of such seals.

The insert 29 is constructed of a low-friction material such as carbon and has a somewhat lower coefficient of expansion than the holder 27 which is constructed of metal. The holder 27 generally is a single metallic ring or band and even though the holder 27 and insert 29 are press-fitted together, heat generated by the temperature of the surrounding fluid and by friction in the seal causes the holder 27 to expand relative to the insert 29. This reduces the strength and stability of the assembled holder and insert and its ability to maintain a proper seal under the developed stresses. Furthermore, these elevated temperatures can cause the holder 27 to distort so that the rubbing face 30 on the insert 29 is no longer flat or parallel to the rubbing face 28 on the ring 25 thereby allowing pressure leakage across the seal. Finally, sufficiently high temperatures can cause the holder 27 to expand to a point where the press fit between the insert 29 and holder 27 is lost. This too causes leakage to occur between these parts.

The present invention overcomes the aforementioned problems by providing a holder and insert assembly which results in a stronger and more stable construction and one which resists distortion or separation of the component parts over a wide range of temperatures. The construction of this invention includes at least two metallic bands which are press fitted together to form a laminated holder, and a non-metallic insert constructed of a low friction material pressed into the laminated holder. When assembled, the holder outer band is in tension and the inner band in compression so that the generated stresses in these parts tend to balance each other. The resultant holder is stronger and more stable than a holder constructed of a single band and maintains an effective seal over a wide range of temperatures.

When the insert 29 is pressed into the laminated holder, the compression loading on the inner band is reduced and, in fact, that band may be loaded now in tension. Even in those cases, however, the amount of tension loading on the inner band is reduced as the assembly is heated and the inner band becomes compression loaded at elevated temperatures. In either event, the overall stresses in this assembly formed of the laminated holder and insert tend to balance one another so that the assembly remains strong and stable over a wide range of temperatures.

As embodied herein, the holder 27 includes two concentric bands 35, 37, which are press-fitted together to form the laminated holder 27. The bands 35, 37 are preferably constructed of stamped sheet metal and may be formed with inturned ends, which abut in the assembled condition. The other ends of the bands align with one another as shown. The insert 29 is press-fitted in the laminated holder 27 and its outer end extends axially beyond the assembled bands 35, 37 as shown. The rubbing face 30 is formed on the outer end of the insert 29.

As further embodied herein and described above, the outer band 35 is in tension and the inner band 37 in compression when these bands are press-fitted together to form the holder 27. When the insert 29 is pressed into the holder 27, it will be understood that compression loading on the inner band 27 is reduced and, in some cases, the band 37 may be in tension. Of course, the insert 29 is compression loaded.

During use, the insert 29 and the seal ring 25 are in rubbing engagement and the assembled holder 27 and the insert 29 become heated by the surrounding fluid and by friction between the insert and seal ring. The coefficient of expansion for the laminated metallic holder 27 is higher than that for the insert 29 so that there is a tendency for the holder 27 to expand faster than the insert 29. However, because of the press-fit between the bands 35, 37 and the resultant loading on these parts as described above, the integrity of the holder 27 and insert 29 is maintained throughout a higher range of temperatures than would be if only a single band or ring is used for the holder 27. Furthermore, the assembled holder 27 and insert 29 form a stronger construction which is better able to withstand stresses in the system and which maintains flatness of the insert rubbing face 28.

The following examples are based on calculations made to illustrate comparisons between a standard single band holder and a double band laminated holder and to point out the advantages of the present invention. Specifically, the following examples illustrate the maximum temperature rise which can be sustained by standard assembled inserts and holders (single band) and assembled inserts and holder (double band) according to this invention before loss of integrity between the parts. It will be appreciated that these calculations are also representative of the relative strengths of the assembled holders and inserts.

EXAMPLE 1

A double ring and insert assembly, according to the present invention, has the following dimensions:

| | |
|---|---|
| OD of outer band 35: | 2.310" + .000 / − .001 |
| ID of outer band 35: | 2.286" + .002 / − .000 |
| OD of inner band 37: | 2.297" + .005 / − .005 |
| ID of inner band 37: | 2.210" + .003 / − .000 |
| OD of insert 29: | 2.2205" + .0005 / − .0005 |
| ID of insert 29: | 1.970" + .002 / − .002 |

The bands 35, 37 are constructed of Carpenter 20 cb-3 which is a corrosion-resistant stainless steel containing about 20% chromium, about 30–35% nickel, and columbiun for stabilization, and is a product of Carpenter Technology Corporation. The insert 29 is constructed of carbon. The bands 35, 37 have a modulus of elasticity of $28.0 \times 10^6$, a Poisson ratio of 0.300, a coefficient of thermal expansion of $9.4 \times 10^{-6}$, and a yield point of $55 \times 10^3$ psi. The insert 29 has a modulus of elasticity of $3.0 \times 10^6$, a Poisson ratio of 0.16, a coefficient of thermal expansion of $2.6 \times 10^{-6}$, and a yield stress of $36 \times 10^3$ psi.

For the maximum wall thicknesses of bands 35, 37 and 0.007" interference between the insert 29 and the inner band 37, the outer band 35 is stressed in tension beyond its yield point so that it is in tension at $55 \times 10^3$ psi. Initial assembly of the inner ring 37 in the outer band 35 puts the inner band 37 in compression but after the insert 29 is pressed in place, the band 37 is stressed to approximately $11 \times 10^3$ psi in tension. Insert 29 is in compression and is stressed to approximately $8.9 \times 10^3$ psi at its OD and $10 \times 10^3$ psi at its ID. The bands 35, 37 have an interference fit of about 0.004", and, as described above, there is about 0.007" interference between the inner band 37 and the insert 29.

Calculations show that when this assembly is exposed to a temperature rise of about 404° F., the inner and outer bands 35, 37 remain in interference since their coefficients of thermal expansion are the same. However, the holder 27 expands faster than the insert 29 and interference between these parts approaches zero, approximately 0.00093", at this temperature rise. Outer band 35 remains in tension at about $34 \times 10^3$ psi while inner band 37 now is in compression at $9.6 \times 10^3$ psi. Insert 29 is in compression at $2.5 \times 10^3$ psi at its OD and $2.8 \times 10^3$ psi at its ID. Thus, for this example, integrity of the parts is maintained at a temperature rise of up to about 404° F.

EXAMPLE 2

The same calculations were made for an assembly where the interference between the insert 29 and inner band 37 is 0.007" but with the minimum wall thickness for the bands 35, 37. Again, outer band 35 is stressed beyond its elastic limit and is in tension at $55 \times 10^3$ psi. Inner band 37 is also in tension at $14 \times 10^3$ psi, while the insert 29 is in compression at $8.6 \times 10^3$ psi at its OD and $9.7 \times 10^3$ psi at its ID. Effective interference is maintained between all the parts.

When this assembly is exposed to a temperature rise of about 398° F., interference between the inner band 37 and the insert 29 approaches zero, i.e., 0.001". Outer band 35 remains in tension at $32.5 \times 10^3$ psi while inner band 37 is in compression at $9 \times 10^3$ psi. Insert 27 is in compression at its OD at $25 \times 10^3$ psi and its ID at $28 \times 10^3$ psi. The maximum operating range limit for this example is a temperature rise of about 398° F.

EXAMPLE 3

Calculations were made for the insert and double band assembly where the interference between the insert 29 and the inner band 37 is 0.011" and for maximum wall thickness of the outer and inner bands 35, 37. It was found that the maximum temperature rise which this assembly could sustain and yet maintain its integrity is 656° F. At this temperature rise, intereference between the inner band 37 and the insert 29 approaches zero, i.e., 0.001". The outer band 35 is in tension at $24.6 \times 1^3$ psi, the inner band 37 is in compression at $6.7 \times 10^3$ psi, and the insert 29 is in compression at $2.5 \times 10^3$ psi at its OD and $2.8 \times 10^3$ psi at its ID.

EXAMPLE 4

Calculations for an assembly having 0.011" interference between the inner band 37 and insert 29, and minimum wall thicknesses for the bands 35, 37 show a maximum allowable temperature rise of 649° F. to maintain integrity between the parts.

EXAMPLE 5

Calculations were also made for an assembly utilizing a single band and insert wherein the band and insert have an interference of 0.007" and wherein the band remains below its yield point. The same insert 29 dimensions identified above in Example 1 were used and the single band has an OD of $$2.262'' \begin{array}{l} + .000 \\ - .002 \end{array}$$

and an ID of $$2.210'' \begin{array}{l} + .003 \\ - .000 \end{array}$$

As was the case in Example 1, maximum wall thickness for the holder ring was employed.

When assembled, the band is in tension at $33.5 \times 10^3$ psi while the insert is in compression at $5.6 \times 10^3$ psi at its OD and $6.7 \times 10^3$ psi at its ID. The calculations show that for maximum wall thickness for the band, interference between the parts approaches zero, i.e., 0.002" at a temperature rise of 342° F. compared to 404° F. for the double band assembly of Example 1.

EXAMPLE 6

The same calculations were made for a single band holder and insert assembly as described above in Example 5 except that minimum wall thickness for the band was used. Again, interference approaches zero, i.e., 0.002", at a temperature rise of 342° F. compared to 398° F. for Example 3.

EXAMPLE 7

Calculations were made on the same assemblies as in Examples 5 and 6 above except that interference between the band and the insert was set at 0.011". The maximum temperature rise which can be sustained by this construction is 342° F. compared to 656° F. and 649° F. for Examples 3 and 4.

EXAMPLE 8

Finally, calculations were made for a single band holder and insert assembly using the same dimensional insert as described above and a band which is stressed to its yield point at assembly. The OD of the band is $$2.231'' \begin{array}{l} - .002 \\ + .000 \end{array}$$

and its ID is $$2.210'' \begin{array}{l} - .000 \\ + .003 \end{array}$$

At both maximum and minimum thickness of the band and an interference of 0.007", the assembly can sustain a temperature rise of 327° F. The same maximum allowable temperature rise, i.e., 327° F. was found for this assembly at 0.011" interference.

From the examples described above, it is apparent that the double band assembly at 0.007" interference can operate at a temperature of 56° F. higher than a single band assembly stressed below its yield point, and 71° F. higher than the single band assembly stressed to its yield point. For assemblies with 0.011" interference, the double band assembly can operate at a temperature of 307° F. higher than the single band assembly initially stressed below its yield point. Thus, the present invention represents a substantial improvement over previous constructions utilizing a single band in maintaining seal integrity at higher operating temperatures.

It will be apparent to those skilled in the art that various additions, substitutions, modifications, and omissions can be made to the construction of the present invention without departing from the scope or spirit of the invention, and it is intended that the present invention cover those additions, substitutions, modifications, and omissions provided they come within the scope of the appended claims and their equivalents.

What is claimed is:

1. A mechanical face seal comprising rotatable and non-rotatable members rubbingly engageable along substantially radial faces, one of said members including a holder formed by a plurality of bands which are press fitted to one another, the outermost band being in tension and the innermost band in compression so that the stresses in the bands tend to balance one another, and an annular insert press-fitted into the holder and formed with one of said rubbingly engageable faces.

2. A mechanical face seal as claimed in claim 1, said bands being constructed of metal and said insert being constructed of a low-friction, non-metallic material.

3. A mechanical face seal as claimed in claim 2, said holder including two concentric bands, said innermost band being in tension upon initial insertion of said insert into said holder.

4. In a mechanical face seal of the type including a rotatable seal member fixed to a shaft and a non-rotatable member, said rotatable and non-rotatable members having confronting radial faces in rubbing engagement; the improvement wherein one of said members comprises a composite assembly including at least two concentric metallic bands press-fitted together and forming a laminated holder, the outermost band being in tension and innermost band being in compression so that stresses in the bands tend to balance one another, and a non-metallic insert press fitted in the holder.

5. The improvement as claimed in claim 4, said holder including two concentric bands, said innermost band being in tension upon initial insertion of said insert into said holder.

* * * * *